(12) United States Patent
Usoro et al.

(10) Patent No.: US 7,967,339 B2
(45) Date of Patent: Jun. 28, 2011

(54) ACTIVE MATERIAL BASED SAFETY BELT BUCKLE PRESENTER

(75) Inventors: Patrick B. Usoro, Troy, MI (US); Paul W. Alexander, Ypsilanti, MI (US); Alan L. Browne, Grosse Pointe, MI (US); Steven G Corrion, Oxford, MI (US); Xiujie Gao, Troy, MI (US); Nancy L. Johnson, Northville, MI (US); Nilesh D. Mankame, Ann Arbor, MI (US); Lawrence C. Maugh, Ann Arbor, MI (US); Mark Kramarczyk, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 173 days.

(21) Appl. No.: 12/353,253

(22) Filed: Jan. 13, 2009

(65) Prior Publication Data

US 2010/0176581 A1 Jul. 15, 2010

(51) Int. Cl.
*B60R 22/20* (2006.01)
(52) U.S. Cl. .................. 280/801.2; 280/801.1; 180/268; 297/481
(58) Field of Classification Search ............... 280/801.1, 280/801.2; 180/268, 270; 297/468, 481
See application file for complete search history.

(56) References Cited

U.S. PATENT DOCUMENTS

| | | | | |
|---|---|---|---|---|
| 4,231,592 A * | 11/1980 | Scherenberg et al. | ........ | 280/808 |
| 4,763,924 A * | 8/1988 | Karlin et al. | .................. | 280/806 |
| 5,123,673 A * | 6/1992 | Tame | ........................ | 280/801.1 |
| 5,236,220 A * | 8/1993 | Mills | .......................... | 280/801.1 |
| 6,279,954 B1 * | 8/2001 | Townsend et al. | ......... | 280/801.1 |
| 6,308,986 B1 * | 10/2001 | Townsend et al. | ............ | 280/807 |
| 6,467,849 B1 * | 10/2002 | Deptolla | ........................ | 297/464 |
| 6,485,058 B1 * | 11/2002 | Kohlndorfer et al. | ......... | 280/808 |
| 6,550,867 B2 * | 4/2003 | Rogers et al. | ................. | 297/468 |
| 6,669,234 B2 * | 12/2003 | Kohlndorfer et al. | ...... | 280/801.1 |
| 6,769,716 B2 * | 8/2004 | Rouhana et al. | .............. | 280/806 |
| 6,883,834 B2 * | 4/2005 | Grabowski et al. | ......... | 280/801.2 |
| 7,370,983 B2 * | 5/2008 | DeWind et al. | ............... | 359/844 |
| 7,407,193 B2 * | 8/2008 | Yamaguchi et al. | .......... | 280/805 |
| 7,600,301 B2 * | 10/2009 | Rudduck et al. | ............... | 24/606 |
| 7,686,338 B2 * | 3/2010 | Dallwig et al. | ............ | 280/801.1 |
| 2001/0020783 A1 * | 9/2001 | Townsend et al. | ......... | 280/801.1 |
| 2001/0040369 A1 * | 11/2001 | Townsend et al. | ......... | 280/801.1 |
| 2002/0043872 A1 * | 4/2002 | Townsend et al. | ............ | 280/801.1 |
| 2002/0089164 A1 * | 7/2002 | Rouhana et al. | ......... | 280/801.1 |
| 2002/0167212 A1 * | 11/2002 | Rogers et al. | ................. | 297/468 |
| 2003/0075914 A1 * | 4/2003 | Kohlndorfer et al. | ......... | 280/808 |
| 2004/0217583 A1 * | 11/2004 | Wang | ............................ | 280/805 |
| 2005/0172462 A1 * | 8/2005 | Rudduck et al. | ................ | 24/606 |
| 2005/0224270 A1 * | 10/2005 | Holbein et al. | ............... | 180/268 |
| 2005/0236209 A1 * | 10/2005 | Chernoff et al. | .............. | 180/268 |
| 2006/0050018 A1 * | 3/2006 | Hutzel et al. | ..................... | 345/60 |
| 2006/0113785 A1 * | 6/2006 | Sugiyama et al. | ......... | 280/801.1 |
| 2006/0119091 A1 * | 6/2006 | Takao et al. | ................ | 280/801.1 |
| 2006/0138797 A1 * | 6/2006 | Wang et al. | ................. | 296/68.1 |
| 2006/0164230 A1 * | 7/2006 | DeWind et al. | ............... | 340/461 |
| 2006/0181073 A1 * | 8/2006 | Sugiyama et al. | ......... | 280/801.1 |
| 2006/0231317 A1 * | 10/2006 | Yamaguchi et al. | .......... | 180/268 |
| 2007/0096450 A1 * | 5/2007 | Gyllenspetz et al. | ...... | 280/801.1 |
| 2007/0096535 A1 * | 5/2007 | Lundell et al. | ................ | 297/470 |

(Continued)

*Primary Examiner* — Paul N. Dickson
*Assistant Examiner* — Barry Gooden, Jr.

(57) ABSTRACT

A safety belt buckle presenter adapted for use with a translatable buckle includes an active material element operable to undergo a reversible change when exposed to an activation signal, wherein the element is drivenly coupled to the buckle, and configured to cause the buckle to translate between deployed and stowed positions as a result of the change.

12 Claims, 9 Drawing Sheets

U.S. PATENT DOCUMENTS

| | | | |
|---|---|---|---|
| 2007/0109104 A1* | 5/2007 | Altan et al. | 340/407.1 |
| 2008/0018088 A1* | 1/2008 | Gray | 280/808 |
| 2008/0129098 A1* | 6/2008 | Kennedy et al. | 297/354.1 |
| 2009/0014991 A1* | 1/2009 | Smyth et al. | 280/734 |
| 2009/0085339 A1* | 4/2009 | Dallwig et al. | 280/801.1 |
| 2009/0112407 A1* | 4/2009 | Kneller et al. | 701/45 |
| 2009/0206581 A1* | 8/2009 | Lawall et al. | 280/728.3 |
| 2009/0218859 A1* | 9/2009 | Lawall et al. | 297/216.1 |
| 2009/0266925 A1* | 10/2009 | Browne et al. | 242/410 |
| 2009/0267339 A1* | 10/2009 | Usoro et al. | 280/807 |
| 2010/0066151 A1* | 3/2010 | Usoro et al. | 297/481 |
| 2010/0154181 A1* | 6/2010 | Flanigan et al. | 24/453 |

* cited by examiner

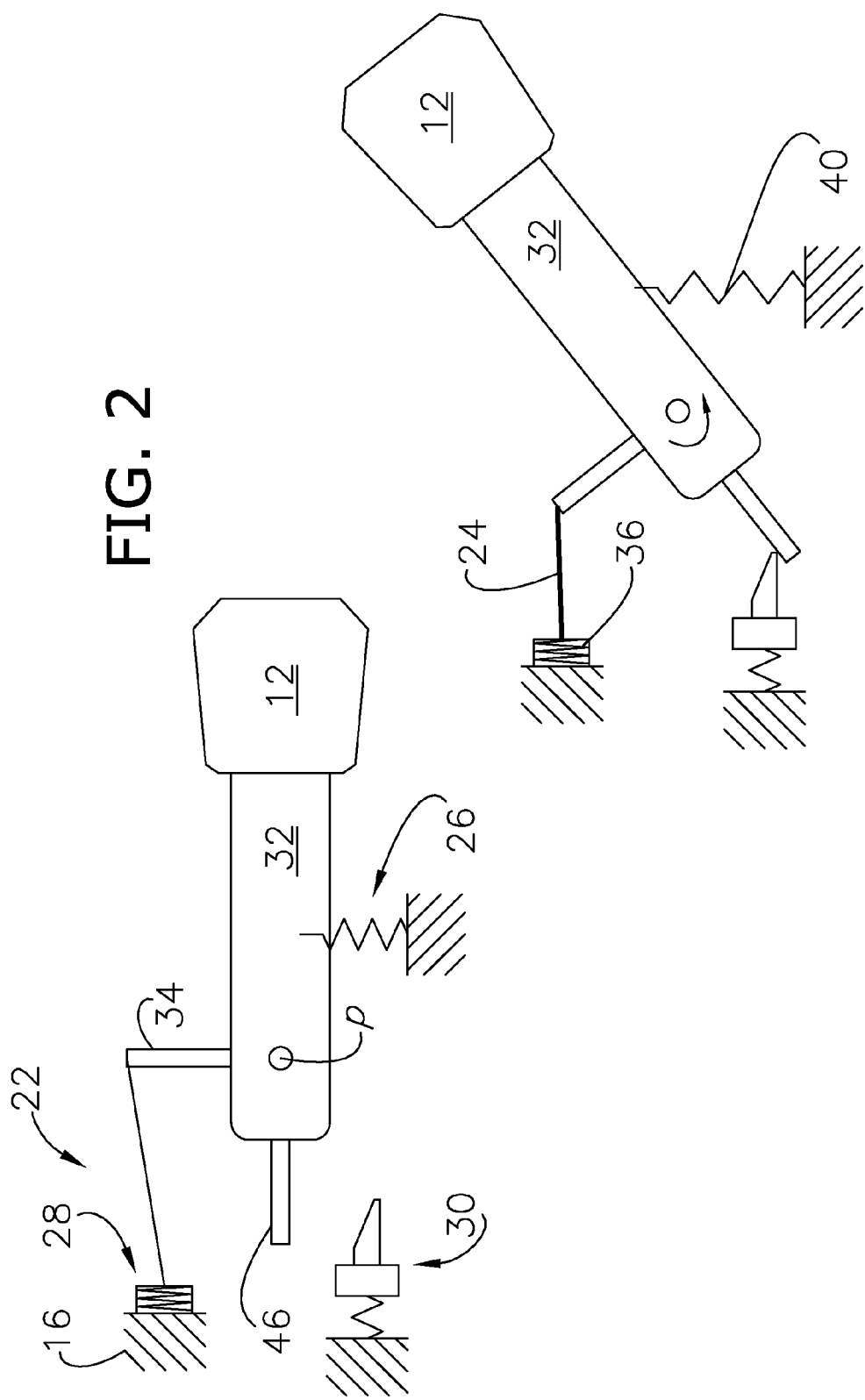

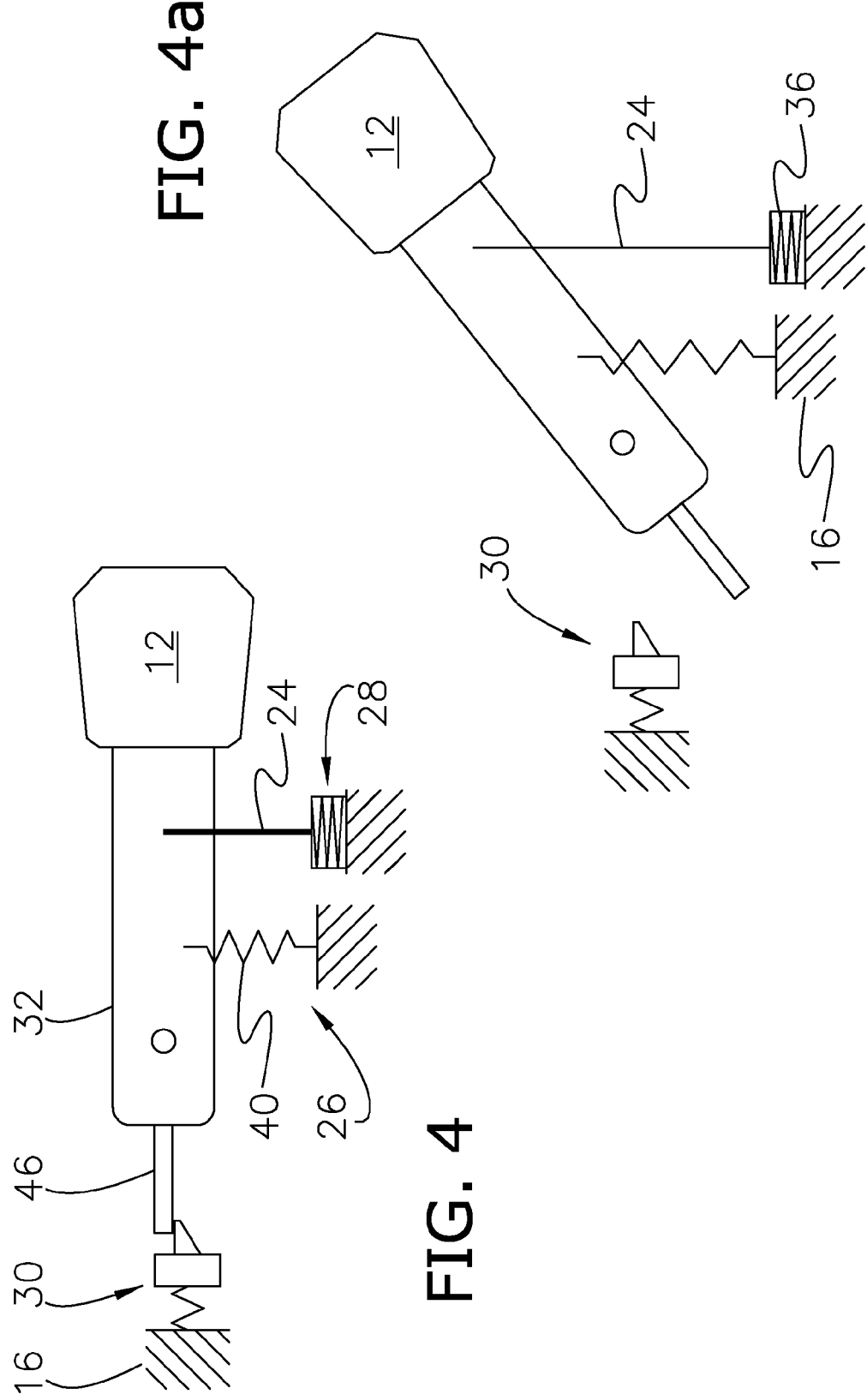

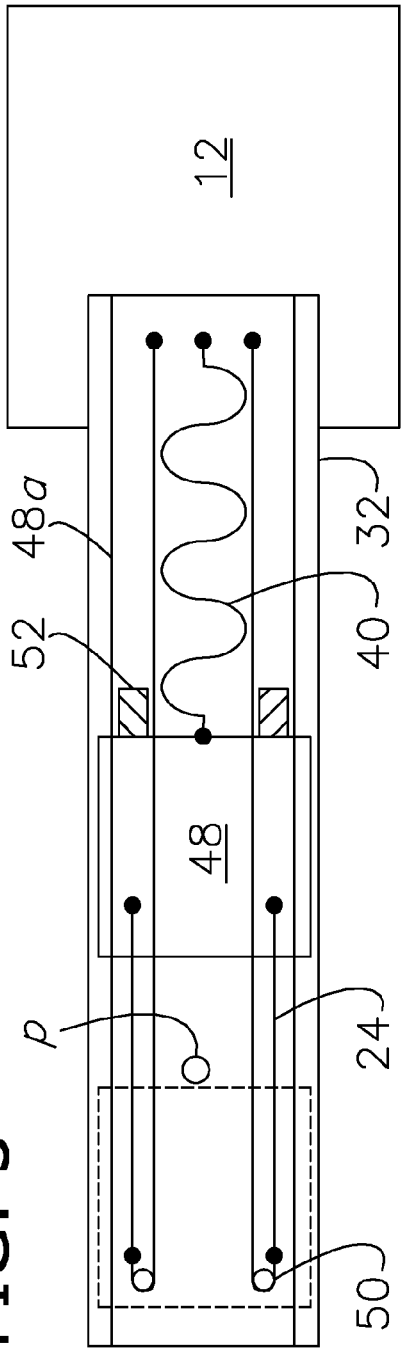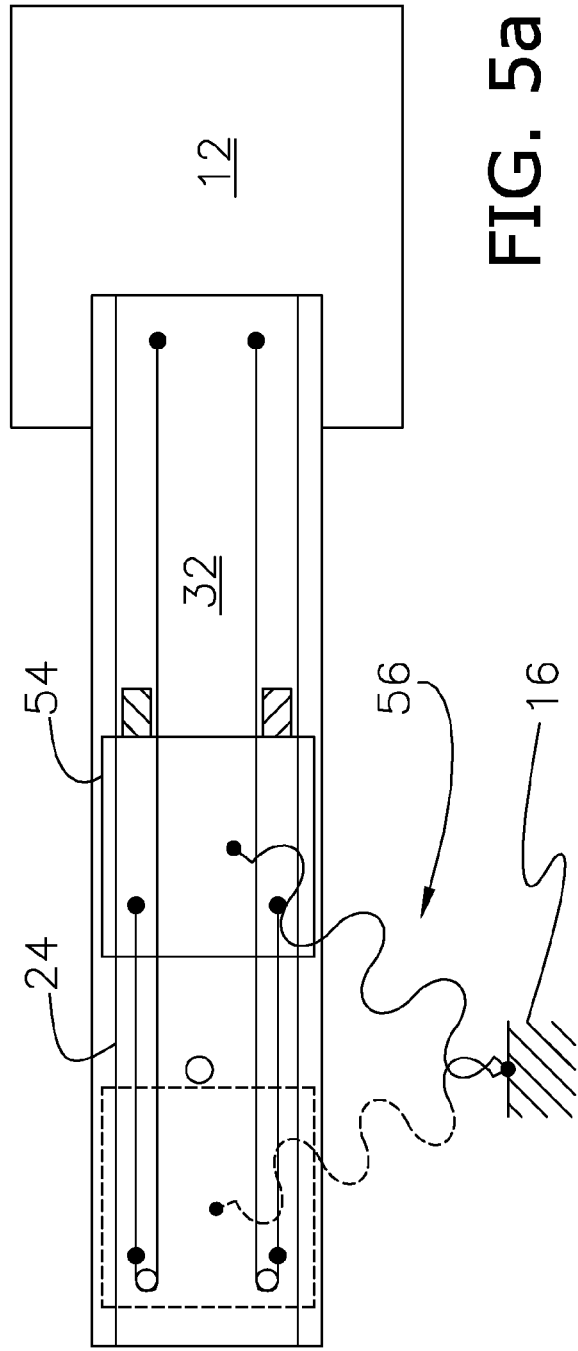

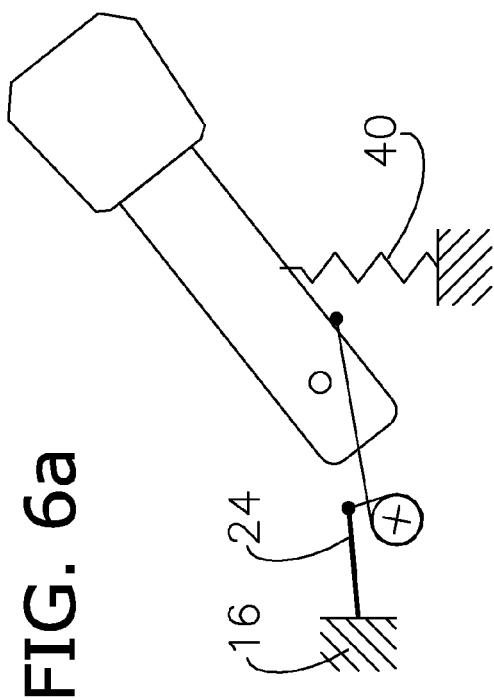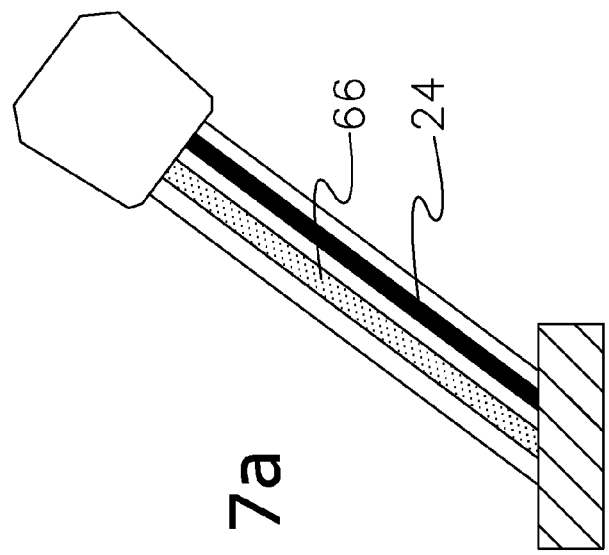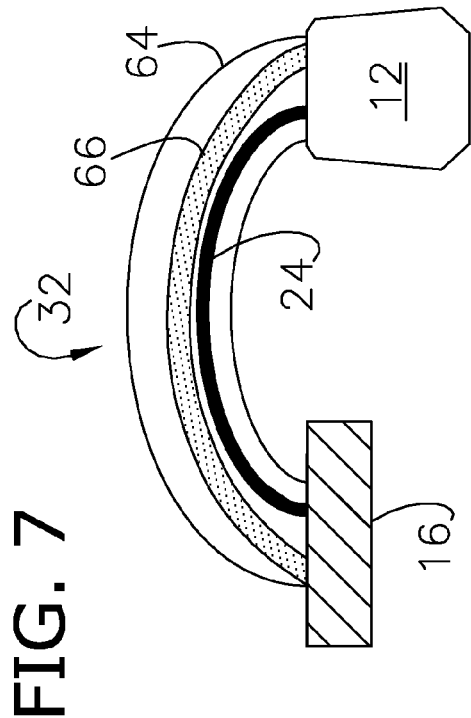

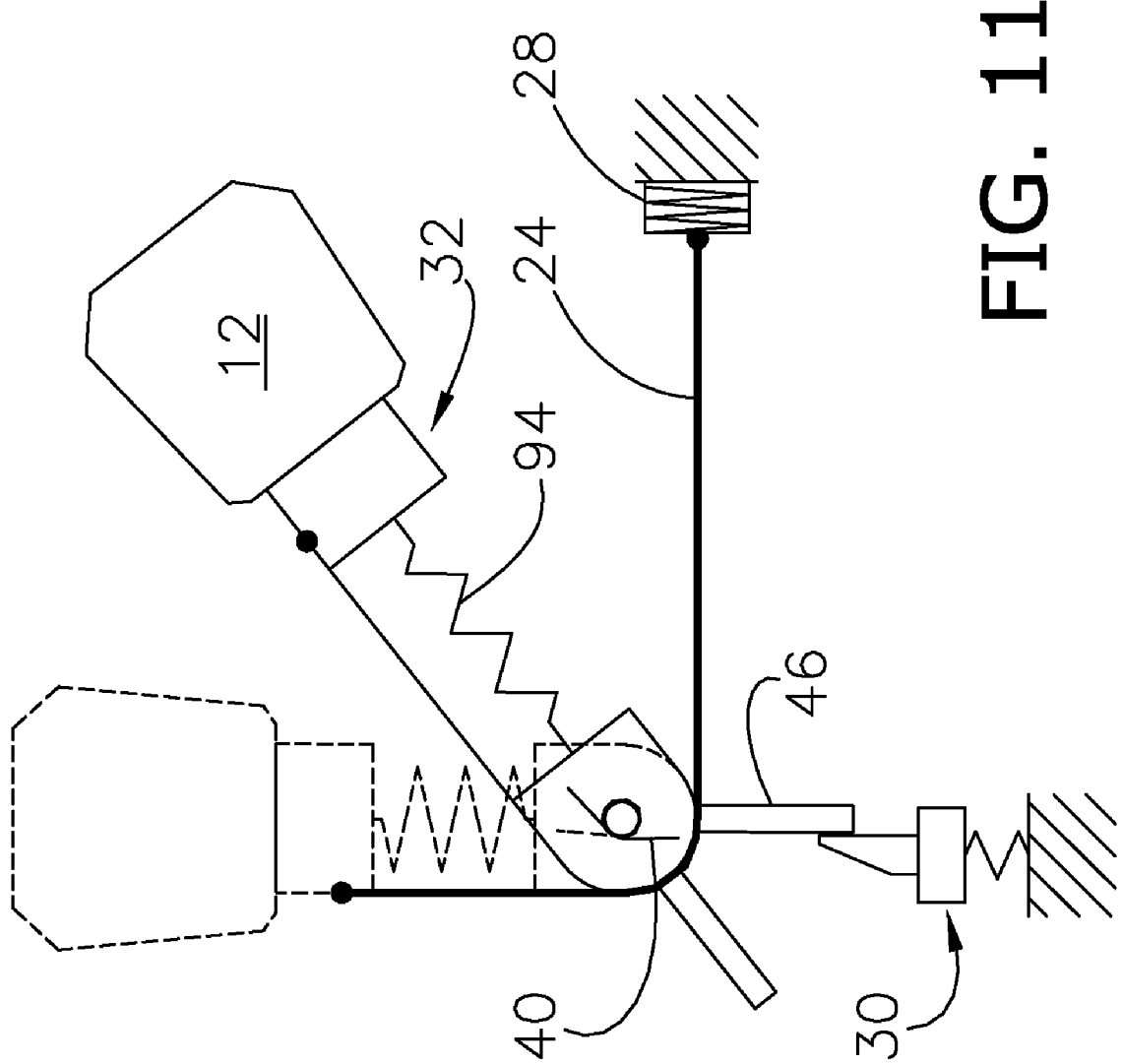

US 7,967,339 B2

ACTIVE MATERIAL BASED SAFETY BELT BUCKLE PRESENTER

BACKGROUND OF THE INVENTION

1. Technical Field

This disclosure generally relates to safety belt buckles and more particularly, to active material based safety belt buckle presenters and methods of manipulating a buckle utilizing active material actuation.

2. Background Art

Safety belt buckles have long been developed as part of safety systems used, for example, in automotive applications. These systems typically include an insertable structure (or "tongue") configured to mate with the afore-mentioned buckle when inserted therein, so as to result in a fastened clasp. A continuous belt formed in part by the clasp provides a surrounding restraint that protects a user, for example, during sudden stop automotive conditions. Of concern, however, are the fixed configurations traditionally presented by these systems. More particularly, it is appreciated that conventional buckles are either in a constant readily accessible, but always visible position, or a more hidden, but difficult to reach position relative to the user.

BRIEF SUMMARY

In response to the afore-mentioned concerns, the present invention recites an active material based safety belt buckle presenter configured to selectively cause the buckle to translate between deployed and stowed conditions. That is to say, the inventive buckle presenter is operable to stow the buckle when it is not needed, and to automatically present the buckle when desired. As such, the invention is useful for aiding physically challenged users (e.g., the disabled, elderly, youth, etc.) to fasten their seat belts, and serves to remind and increase convenience for all users.

The use of active material actuators in lieu of mechanical devices such as solenoids, servo-motors, and the like, minimize the complexity associated with automation. Moreover, the use of active materials generally provides a lighter weight alternative, minimizes packaging space, and reduces noise both acoustically and with respect to electromagnetic field (EMF) outputs.

Thus, the invention generally concerns an autonomous safety buckle presenter adapted for use with a fixed structure, such as a passenger seat of a vehicle. The presenter includes a buckle translatably connected to the structure, so as to be caused to achieve deployed and stowed positions, and an actuator including at least one active material element operable to undergo a reversible change when exposed to an activation signal. The actuator is drivenly coupled to the buckle, such that the buckle is caused to translate to one of said deployed and stowed positions, as a result of the change. The invention further includes a source operable to generate the signal, so as to expose the element thereto, and at least one sensor configured to detect a condition, and communicatively coupled to the actuator and source. The sensor and source are cooperatively configured to generate the signal only when the condition is detected.

Other aspects and advantages of the present invention, including the employment of a shape memory alloy wire, and other active materials during actuation, latching mechanisms for presenting a zero-power hold, and various configurations of active-material based presenters will be apparent from the following detailed description of the preferred embodiment(s) and the accompanying drawing figures.

BRIEF DESCRIPTION OF THE SEVERAL VIEWS OF THE DRAWING

A preferred embodiment(s) of the invention is described in detail below with reference to the attached drawing figures, wherein:

FIG. 2 is a schematic elevation of a pivotal buckle and strap, and an active material based presenter including a shape memory alloy (SMA) wire, return spring, and a latching mechanism, in accordance with a preferred embodiment of the invention;

FIG. 2a is a schematic elevation of the buckle, strap and presenter shown in FIG. 2, wherein the SMA wire has been activated, and the buckle is in the deployed position;

FIG. 4 is a schematic elevation of a pivotal buckle and strap, and an active material based presenter including a SMA wire, an actuator spring, and strain relief and latching mechanisms, in accordance with a preferred embodiment of the invention;

FIG. 4a is a schematic elevation of the buckle, strap and presenter shown in FIG. 4, wherein the wire has been deactivated and the buckle is in the deployed position;

FIG. 5 is a schematic elevation of a pivotal buckle and strap, and an active material based presenter including a plurality of SMA wires and a return spring attached to a counter weight, in accordance with a preferred embodiment of the invention;

FIG. 5a is a schematic elevation of the buckle, strap, and presenter shown in FIG. 5, wherein the counter weight is replaced by a slider and the spring is externally attached to the slider so as to produce a biasing force against the buckle in both the stowed and deployed positions depending upon the position of the slider, in accordance with a preferred embodiment of the invention;

FIG. 6 is a schematic elevation of a pivotal buckle and strap, and an active material based buckle presenter including an external lever inter-engaging at least one SMA wire and buckle, in accordance with a preferred embodiment of the invention;

FIG. 6a is a schematic elevation of the buckle, strap and presenter shown in FIG. 6, wherein the wire has been activated and the buckle is in the deployed position;

FIG. 7 is a schematic elevation of a buckle, flexible strap having therein a flexible member, and an active material based buckle presenter including at least one SMA band interconnecting the buckle to a fixed structure, in accordance with a preferred embodiment of the invention;

FIG. 7a is a schematic elevation of the buckle, strap and presenter shown in FIG. 7, wherein the wire has been activated and the buckle is in the deployed position;

FIG. 11 is a schematic elevation of a pivotal and collapsible buckle and strap, and an active material based presenter including an SMA wire, and a torsional return spring in vertically stowed (in hidden-line type) and deployed positions, in accordance with a preferred embodiment of the invention.

DETAILED DESCRIPTION

Figure 1:
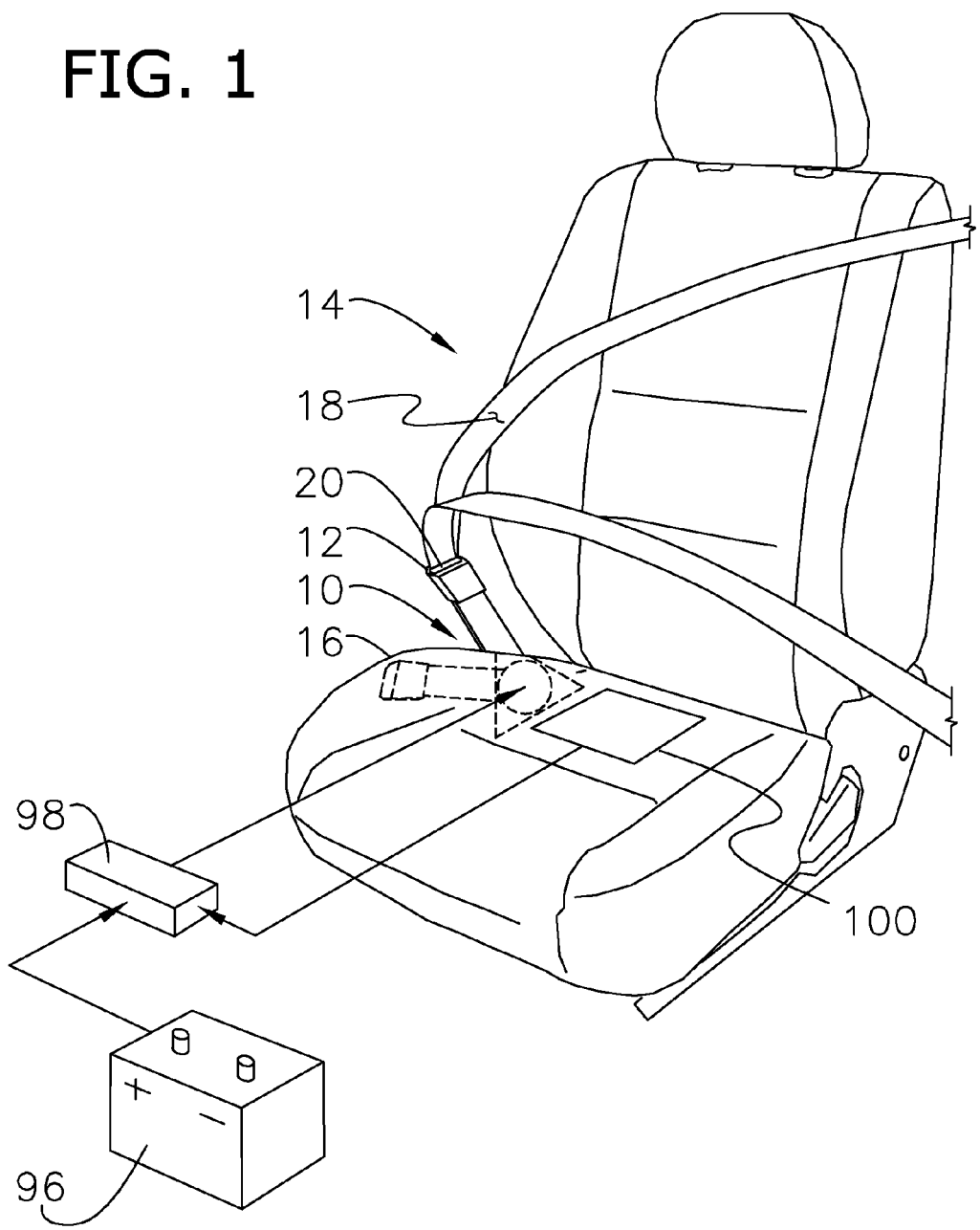
FIG. 1 is a perspective view of a passenger seat, safety belt system including a buckle, buckle strap, and a safety belt buckle presenter having an active material actuator, and further including a sensor, controller, and signal source communicatively coupled to the actuator.
Figure 1A:
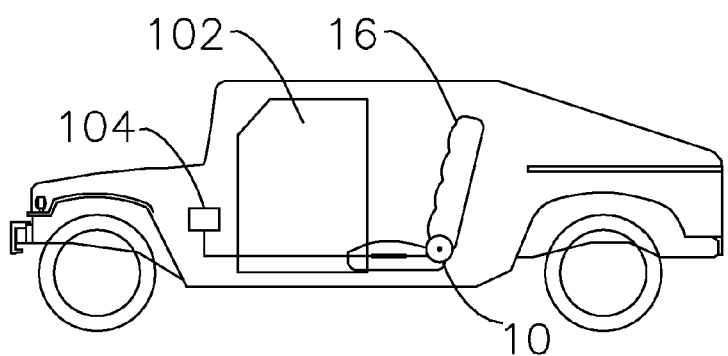
FIG. 1a is an elevation of a vehicle, including an active material based safety belt buckle presenter, in accordance with a preferred embodiment of the invention.

The present invention presents an active material based safety belt buckle presenter 10 and methods of selectively deploying and stowing a safety belt buckle 12 utilizing active material actuation. As shown in FIG. 1, the presenter 10 is adapted for use with a seat belt safety system 14, such as employed in automotive and/or aviation applications. The system 14 includes the afore-mentioned buckle 12, a buckle strap interconnecting the buckle 12 to a fixed structure (e.g., a frame member of the associative passenger seat, the center console or floor of a vehicle, etc.) 16, a safety belt webbing 18, and a durable structure 20 attached to the webbing 18 and configured to be inserted within the buckle 12, so as to form a clasp. In the clasped condition, a tensioner (not shown) causes the webbing 18 to form a surrounding restraint around the occupant (also not shown). Although depicted and described with respect to a passenger seat 16, it is appreciated that the inventive presenter 10 may be used wherever facilitating the use of a safety belt system is desired.

I. Active Material Discussion and Function

As used herein the term "active material" shall be afforded its ordinary meaning as understood by those of ordinary skill in the art, and includes any material or composite that exhibits a reversible change in a fundamental (e.g., chemical or intrinsic physical) property, when exposed to an external signal source. Thus, active materials shall include those compositions that can exhibit a change in stiffness properties, shape and/or dimensions in response to the activation signal, which can take the type for different active materials, of electrical, magnetic, thermal and like fields.

Suitable active materials for use with the present invention include but are not limited to shape memory materials such as shape memory alloys, and shape memory polymers. Shape memory materials generally refer to materials or compositions that have the ability to remember their original at least one attribute such as shape, which can subsequently be recalled by applying an external stimulus. As such, deformation from the original shape is a temporary condition. In this manner, shape memory materials can change to the trained shape in response to an activation signal. Exemplary active materials include the afore-mentioned shape memory alloys (SMA) and shape memory polymers (SMP), as well as shape memory ceramics, electroactive polymers (EAP), ferromagnetic SMA's, electrorheological (ER) compositions, magnetorheological (MR) compositions, dielectric elastomers, ionic polymer metal composites (IPMC), piezoelectric polymers, piezoelectric ceramics, various combinations of the foregoing materials, and the like.

Shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. The term "yield strength" refers to the stress at which a material exhibits a specified deviation from proportionality of stress and strain. Generally, in the low temperature, or martensite phase, shape memory alloys can be plastically deformed and upon exposure to some higher temperature will transform to an austenite phase, or parent phase, returning to their shape prior to the deformation. Materials that exhibit this shape memory effect only upon heating are referred to as having one-way shape memory. Those materials that also exhibit shape memory upon re-cooling are referred to as having two-way shape memory behavior.

Shape memory alloys exist in several different temperature-dependent phases. The most commonly utilized of these phases are the so-called Martensite and Austenite phases discussed above. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$).

When the shape memory alloy is in the austenite phase and is cooled, it begins to change into the martensite phase, and the temperature at which this phenomenon starts is referred to as the martensite start temperature ($M_s$). The temperature at which austenite finishes transforming to martensite is called the martensite finish temperature ($M_f$). Generally, the shape memory alloys are softer and more easily deformable in their martensitic phase and are harder, stiffer, and/or more rigid in the austenitic phase. In view of the foregoing, a suitable activation signal for use with shape memory alloys is a thermal activation signal having a magnitude to cause transformations between the martensite and austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the martensite to austenite type transition, and the material will recover the original, annealed shape. Hence, one-way shape memory effects are only observed upon heating. Active materials comprising shape memory alloy compositions that exhibit one-way memory effects do not automatically reform, and will likely require an external mechanical force to reform the shape.

Intrinsic and extrinsic two-way shape memory materials are characterized by a shape transition both upon heating from the martensite phase to the austenite phase, as well as an additional shape transition upon cooling from the austenite phase back to the martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

Thus, for the purposes of this invention, it is appreciated that SMA's exhibit a modulus increase of 2.5 times and a dimensional change of up to 8% (depending on the amount of pre-strain) when heated above their Martensite to Austenite phase transition temperature. It is appreciated that thermally induced SMA phase changes are one-way so that a biasing force return mechanism (such as a spring) would be required to return the SMA to its starting configuration once the applied field is removed. Joule heating can be used to make the entire system electronically controllable. Stress induced phase changes in SMA are, however, two way by nature. Application of sufficient stress when an SMA is in its Austenitic phase will cause it to change to its lower modulus Martensitic phase in which it can exhibit up to 8% of "superelastic" deformation. Removal of the applied stress will cause the SMA to switch back to its Austenitic phase in so doing recovering its starting shape and higher modulus.

Ferromagnetic SMA's (FSMA's), which are a sub-class of SMAs, may also be used in the present invention. These materials behave like conventional SMA materials that have a stress or thermally induced phase transformation between martensite and austenite. Additionally FSMA's are ferromagnetic and have strong magnetocrystalline anisotropy, which permit an external magnetic field to influence the orientation/fraction of field aligned martensitic variants. When the magnetic field is removed, the material may exhibit complete two-way, partial two-way or one-way shape memory. For partial or one-way shape memory, an external stimulus, temperature, magnetic field or stress may permit the material to return to its starting state. Perfect two-way shape memory may be used for proportional control with continuous power supplied. One-way shape memory is most useful for rail filling applications. External magnetic fields are generally produced via soft-magnetic core electromagnets in automotive applications, though a pair of Helmholtz coils may also be used for fast response.

Shape memory polymers (SMP's) generally refer to a group of polymeric materials that demonstrate the ability to return to a previously defined shape when subjected to an appropriate thermal stimulus. Shape memory polymers are capable of undergoing phase transitions in which their shape is altered as a function of temperature. Generally, SMP's have two main segments, a hard segment and a soft segment. The previously defined or permanent shape can be set by melting or processing the polymer at a temperature higher than the highest thermal transition followed by cooling below that thermal transition temperature. The highest thermal transition is usually the glass transition temperature ($T_g$) or melting point of the hard segment. A temporary shape can be set by heating the material to a temperature higher than the $T_g$ or the transition temperature of the soft segment, but lower than the $T_g$ or melting point of the hard segment. The temporary shape is set while processing the material at the transition temperature of the soft segment followed by cooling to fix the shape. The material can be reverted back to the permanent shape by heating the material above the transition temperature of the soft segment.

For example, the permanent shape of the polymeric material may be a wire presenting a substantially straightened shape and defining a first length, while the temporary shape may be a similar wire defining a second length less than the first. In another embodiment, the material may present a spring having a first modulus of elasticity when activated and second modulus when deactivated.

The temperature needed for permanent shape recovery can be set at any temperature between about −63° C. and about 120° C. or above. Engineering the composition and structure of the polymer itself can allow for the choice of a particular temperature for a desired application. A preferred temperature for shape recovery is greater than or equal to about −30° C., more preferably greater than or equal to about 0° C., and most preferably a temperature greater than or equal to about 50° C. Also, a preferred temperature for shape recovery is less than or equal to about 120° C., and most preferably less than or equal to about 120° C. and greater than or equal to about 80° C.

Suitable shape memory polymers include thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), ply(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsequioxane), polyvinylchloride, urethane/butadiene copolymers, polyurethane block copolymers, styrene-butadiene-styrene block copolymers, and the like.

Thus, for the purposes of this invention, it is appreciated that SMP's exhibit a dramatic drop in modulus when heated above the glass transition temperature of their constituent that has a lower glass transition temperature. If loading/deformation is maintained while the temperature is dropped, the deformed shape will be set in the SMP until it is reheated while under no load under which condition it will return to its as-molded shape. While SMP's could be used variously in block, sheet, slab, lattice, truss, fiber or foam forms, they require continuous power to remain in their lower modulus state. Thus, they are suited for reversible shape setting of the insert 10.

Suitable piezoelectric materials include, but are not intended to be limited to, inorganic compounds, organic compounds, and metals. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly(sodium 4-styrenesulfonate), poly (poly(vinylamine) backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarboxylic acids, including poly(methacrylic acid), and their derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including Kapton and polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric materials can also comprise metals selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and mixtures thereof and Group VIA and IIB compounds, such as CdSe, CdS, GaAs, $AgCaSe_2$, ZnSe, GaP, InP, ZnS, and mixtures thereof. Preferably, the piezoelectric material is selected from the group consisting of polyvinylidene fluoride, lead zirconate titanate, and barium titanate, and mixtures thereof.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive, molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

II. Exemplary Configurations, Methods, and Applications

Turning to the structural configuration of the invention, there is shown various embodiments of an active safety belt buckle presenter 10 in FIGS. 1-11. Throughout the illustrated embodiments, the presenter 10 is drivenly coupled to the buckle 12, which is translatably connected to the fixed structure 16, so as to be able to achieve deployed and stowed positions relative thereto. That is to say, the buckle 12 is pivotally, flexibly, or slidingly attached, or attached by a collapsing, telescoping, or otherwise reconfigurable apparatus, body, or assembly to the structure 16, such that its spatial positioning can be adjusted without detaching the buckle 12 from the structure 16. The various embodiments may be used singularly or in combination with other approaches, so as to reduce the individually required force.

The presenter 10 includes an actuator 22 that utilizes at least one element 24 comprising an active material as described in Part (I). When the material is activated or deactivated, i.e., for example, where a thermally activated material is exposed to transformational heat energy or caused to undergo Joule heating by an electric current, a magnetorestrictive element is exposed to a magnetic field, or a stress activated element is exposed to a transformational force, the actuator 22 is configured to create a driving force. The actuator 22 is coupled to the buckle 12, such that the force is operable to cause the buckle 12 to translate to the deployed or stowed position. As shown in the illustrated embodiments, and discussed further below, the preferred presenter 10 further includes a biasing mechanism 26, such as a spring, weight, or hydraulic/pneumatic pressure system, a strain relief mechanism 28 configured to relieve stress/strain within the element 24 when deployment of the buckle 12 is otherwise blocked, and a latching mechanism 30.

Figure 3:
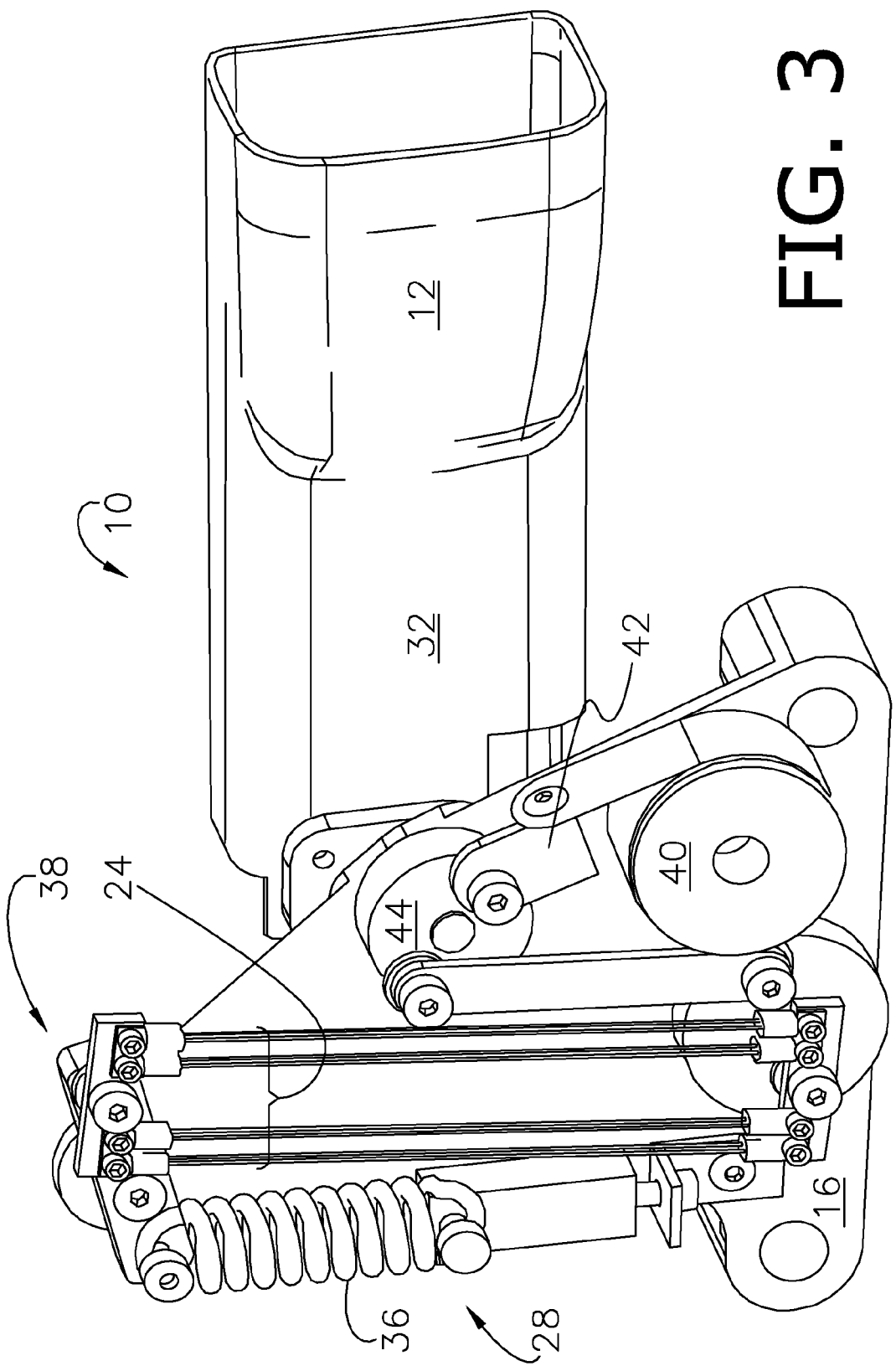
FIG. 3 is a perspective view of a pivotal buckle and strap, and an active material based presenter including a plurality of SMA wires, a return leaf spring engaging a pawl, and a strain relief mechanism, in accordance with a preferred embodiment of the invention.

In a first embodiment shown in FIGS. 2 and 2a, the buckle 12 is pivotally connected to the structure 16; for example, the buckle 12 may be connected to a horizontal rail of the passenger seat frame (not shown). The buckle 12 is preferably connected to the structure 16 by a preferably rigid strap 32 that defines buckle engaging and free ends, as well as pivot axis, p. As shown, the pivot axis is preferably defined closer to the free end of the strap 32, so as to provide mechanical advantage with respect to displacement. A first prong 34 is fixedly attached to the strap 32 and orthogonally intercepts the pivot axis (FIG. 2). The actuator 22 generally consists of at least one SMA wire 24 connected to the distal end of the first prong 34 and to the fixed structure 16 at the other end. The actuator 22 may be attached to the strap 32 directly without the need for the prong 34. To increase structural capacity, a fastener (not shown) such as a metal crimp, or flattened tube may be used to interconnect the wire 24 and prong 34. Finally, it is appreciated that a plurality of SMA wires 24 are preferably used to provide redundancy (such as shown in FIG. 3). When caused to contract by a thermal activation signal, the wires 24 impart a linear force at the connection point of the first prong 34, which causes a moment about the pivot axis.

As illustrated, the strain relief mechanism 28 may include an extension spring 36 intermediately coupled between the wire 24 and structure 16 (FIG. 2). As shown in FIG. 3, the relief mechanism 28 may further include a lever 38 intermediately coupled between the spring 36 and wire 24, and defining a pivot. The lever 38 facilitates packaging and/or provides mechanical advantage in the mechanism 28, where a non-medial pivot is defined. More preferably, the lever 38 presents adjustable spacing between the connection points between the wire 24 or spring 36 and the lever 38, such as, for example, through a slot and fastener connection (not shown). This, it is appreciated, provides an adjustable relief trigger that helps facilitate, for example, replacing one or more faulty wires 24 with a dissimilar plurality or configuration of wire. Finally, it is also appreciated that other energy storage elements may be used in lieu of or addition to spring 36, such as a band of elastic material.

It is appreciated that the weight of the buckle 12 and strap 32 will cause their downward translation back to the stowed position (FIGS. 2-3), when the wire 24 is deactivated. More preferably, and as previously stated, however, the presenter 10 includes a biasing or return mechanism 26. The biasing mechanism 26 may include an extension spring 40 (or elastic band, etc.) connected to the strap 32 between the buckle 12 and pivot axis, p, and to the structure 16 below the strap 32. As such, the biasing spring 40 urges the buckle 12 to return to the deactivated position.

In FIG. 3, the return spring 40 presents a leaf configuration that engages a pawl 42; the pawl 42 is pivotally attached to and attempts to rotate with the buckle 12 and strap 32 by disk 44, when at least a portion of the wires 24 are activated. The spring 40 and pawl 42 are cooperatively configured to bias the buckle 12 towards the stowed position (FIG. 3).

As previously mentioned, the preferred presenter 10 further includes a latching mechanism (i.e., latch) 30. In FIGS. 2 and 2a, the latch 30 is configured to engage the buckle 12 in the deployed position, so as to present a zero-power hold when the change is reversed (e.g., the element 24 is deactivated). More particularly, a latch engaging second prong 46 is longitudinally attached to the free end of the strap 32. The prong 46 is configured to engage the latch 30, driving it back, as the strap 32 rotates. Once free, the latch 30 snaps back to its extended condition, thereby preventing the strap 32 from rotating in the clockwise direction. It is appreciated that, where active material actuation is used to stow the buckle 12, the latch 30 may be repositioned and oriented so as to engage the second prong 32 and hold the buckle in the stowed position (FIG. 4). Finally, it is also appreciated that the illustrated latching mechanism 30 is schematically shown and that other latching mechanisms may be utilized.

As also shown in FIGS. 4 and 4a, the return spring 40 may be a compression spring aligned parallel with the actuating force. For example, the compression spring 40 and SMA wire 24 may be attached to the strap 32 between the buckle 12 and pivot axis, p, and to fixed structure 16 at their opposite ends. The spring 40 and wire 24 co-laterally extend from the same side of the strap 32; the particular side depending upon whether the buckle 12 is to be vertically or horizontally stowed. A strain relief mechanism 28 is preferably provided intermediate the wire 24 and structure 16, as previously described.

Thus, in this configuration, activation of the material and contraction of the wire 24, results in the compression of the spring 40 (FIG. 4). When the material is deactivated and allowed to cool past its transition temperature, the spring 40 releases its stored energy thereby causing the strap 32 and buckle 12 to return to the deployed position (FIG. 4*a*). By straining the wire 24, it is appreciated that the release of stored energy by the spring 40 accelerates the rate of transformation of the wire 24 back to the Martensitic state.

In another pivotal embodiment shown in FIG. 5, the presenter 10 includes a counter-weight 48 configured to slide along a longitudinal guide way 48*a* defined by the strap 32. The strap 32 is pivotally connected to fixed structure 16 and defines pivot axis, p. Depending upon the positioning of the weight 48 relative to the axis, the buckle 12 is caused to swing in the clockwise or counter clockwise direction. The preferred actuator 22 includes at least one, and more preferably two SMA wires 24 that are fixedly connected to the strap 32 at or near the buckle end, and to the weight 48. The wires 24 are doubled-over a strap engaged prong 50 or the like, at or near the free end of the strap 32 prior to connecting to the weight 48, and is longitudinally configured to cause the centroid of the weight 48 to traverse the axis, when activated.

A return spring 40 is preferably attached to the weight 48 and strap 32 at or near the buckle end and configured to cause the weight 48 to re-traverse the axis, when the wire 24 is deactivated, thereby causing the return of the buckle 12 to the stowed position (FIG. 5). As such, it is appreciated that the spring 40 exerts a biasing force upon the weight 48 that is less than the actuating force generated by the activated wire(s) 24, so as to be overcome thereby during deployment. To protect the wires 24 from constant strain under spring load, first and second stops 52 may be further attached to the strap 32 as shown (FIG. 5).

In a preferred embodiment, the spring 40 may itself be formed of shape memory alloy material in a normally (i.e., deactivated) austenitic state. As a result, the antagonistic SMA wires 24 and spring 40 are cooperatively configured such that thermal activation of the wires 24 causes a stress induced transformation of the spring 40 to the martensitic state. This reduces the modulus of the spring 40 as well as lengthens the spring material. When the wires 24 are deactivated, the spring 40 returns to the austenitic state, thereby increasing in modulus, and causing the weight 48 to return to the normal position.

In FIG. 5*a*, the counterweight 48 is replaced by a slider 54 and a dual action spring 56 is externally attached to the slider 54. The spring 56 is attached to the fixed structure 16 at a point longitudinally even with the pivot axis of the strap 32 (FIG. 5*a*), so as to generate a diagonal biasing force vector that acts to create a moment about the axis. In this regard, the spring 56 is configured relative to the static friction between the slider 54 and way 48 (effected in part by the vertical force component of the vector), such that the slider 54 is laterally secured in the deployed and stowed positions.

When the wires 24 are activated and the slider 54 is caused to traverse the axis, the orientation of the spring 56 is changed such that the force vector causes an opposite moment about the axis. As such, the spring 56 is configured to produce a biasing force against the buckle 32 in both the stowed and deployed positions depending upon the positioning of the slider 54 relative to the axis. The preferred actuator 22 and spring 56 are cooperatively configured such that the spring 56 presents a majority of the deployment and stowage force necessary; as a result, it is appreciated that less active material (e.g., a lesser plurality of wires 24) may be utilized.

In yet another pivotal strap embodiment shown in FIG. 6, the presenter 10 includes an external lever 58 inter-coupling, so as to be driven by the actuator 22, and drive the buckle 12. As illustrated, the actuator 22 is again presented exemplarily by at least one SMA wire 24. The lever 58 defines a lever axis, and first and second lever arms 60,62. The first arm 60 is attached to the wire(s) 24, so as to preferably define an orthogonal angle therebetween (FIG. 6). The second arm 62 engages the lower edge of the strap 32. The strap 32, in this configuration, presents a rigid pivot arm. More preferably, the first and second arms 60,62 present differing lengths so as to provide mechanical advantage as previously described. For example, in the illustrated embodiment, the arc of rotation is increased, and the applied force is reduced at the distal end of the second arm relative to the distal end of the first. When the wire 24 exerts the actuating force upon the first (or short, as illustrated) arm 60, the lever 58 and long arm 62 are caused to pivot, and the strap 32 is caused to swing about the main pivot axis by the action of the long arm 62 (FIG. 6*a*). A return spring 40 can be attached to the strap 32 and fixed structure 16 as shown, such that the buckle 12 is biased towards the stowed position.

In another example, the strap 32 may be fixedly attached to the structure 16, but present a flexible, collapsing, telescoping, or the like mechanism or material, such that the buckle 12 is translatably attached to the structure 16. In FIG. 7, for example, the strap 32 is formed of an outer layer of malleable (e.g., pliable, etc.) material 64, such as a natural or woven fabric, skin, sheet, or sheath, and includes, where necessary, an interior flexible member 66 that interconnects the buckle 12 and structure 16. The actuator 22 may consist of an SMA of SMP band or rod 24 that is also connected to the buckle 12 and structure 16. The band 24 is configured to achieve deactivated stowed and activated deployed shapes that in turn change the positioning of the buckle 12 (compare, FIGS. 7 and 7*a*). The preferred member 66 is resistively flexible so as to provide support to the buckle 12 when the band 24 is in the deactivated martensitic phase.

Figure 8:
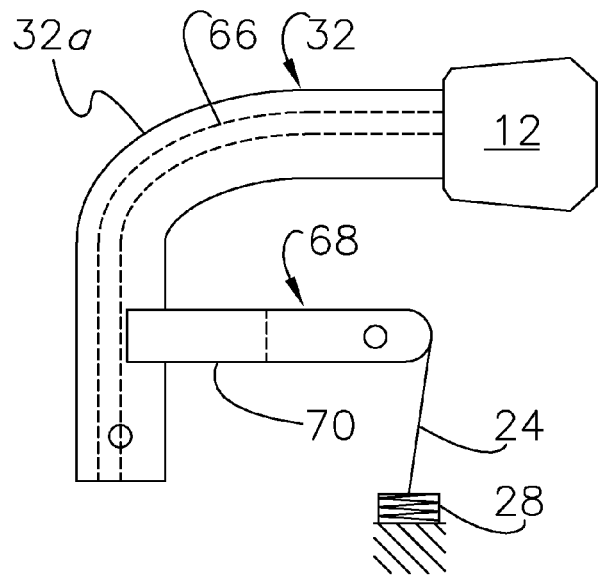
FIG. 8 is a schematic elevation of a buckle, flexible strap, and an active material based buckle presenter including at least one SMA wire, a pivotal presenter arm connected to the wire, and a strain relief mechanism, in accordance with a preferred embodiment of the invention.
Figure 8A:
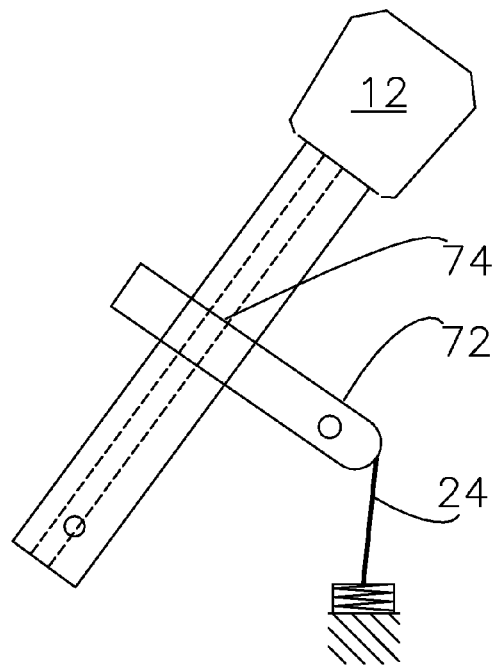
FIG. 8a is a schematic elevation of the buckle, strap and presenter shown in FIG. 8, wherein the wire has been activated and the buckle is in the deployed position.

In another flexible strap embodiment shown in FIG. 8, the strap 32 is formed of malleable material, and may include a flexible member 66 (not shown) for structural reinforcement. The presenter 10 includes an external pivot arm 68 defining a fork 70 at its distal end. The strap 32 is entrained within the fork 70, and is able to travel longitudinally therein. Together the strap 32 and arm 68 are cooperatively configured such that the buckle 12 is caused to achieve the deployed position when the arm 68 is swung to a ten-o'clock position (FIG. 8*a*). The actuator 22 is configured to cause a moment about the pivot axis defined by the arm 68, and may again include at least one SMA wire 24 as shown. The preferred arm 68 defines relatively short and long arm sections 72,74 stemming from the pivot, and the wire 24 is preferably attached to the short arm 72, so that the linear displacement of the wire 24 is magnified at the fork 70. A latch 30 and strain relief mechanism 28 are preferably provided, and configured as previously described. Finally, it is appreciated that only a portion 32*a* (FIG. 8) of the strap 32 needs to be flexible to effect the intended motion.

Figure 9:
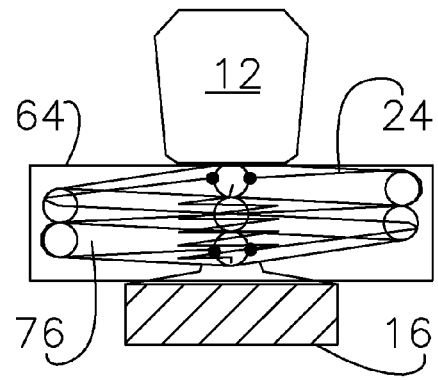
FIG. 9 is a schematic elevation of a buckle, collapsible strap including a scissor assembly connected to the buckle, and an active material based buckle presenter including two SMA wires, and a return spring, in accordance with a preferred embodiment of the invention.
Figure 9A:
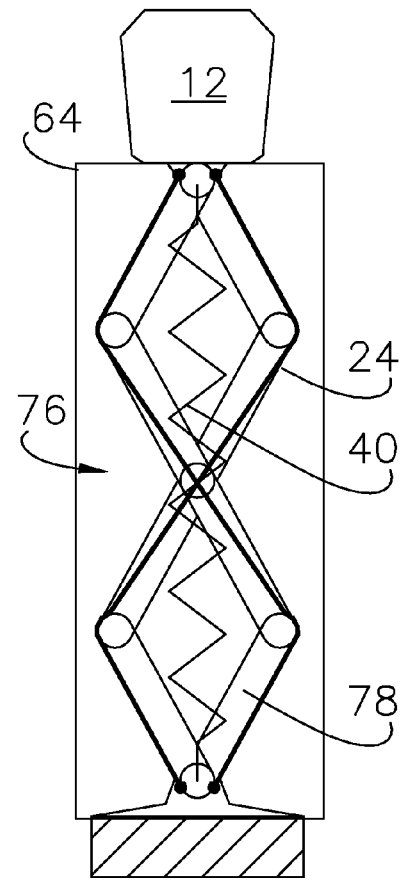
FIG. 9a is a schematic elevation of the buckle, strap and presenter shown in FIG. 9, wherein the wires has been activated and the buckle is in the deployed position.

In FIGS. 9 and 9*a*, the strap 32 includes a malleable outer layer of material 64 and a collapsible scissor assembly (i.e., "scissor") 76. The scissor 76 is formed by a plurality of distally and medially interconnected segments 78 that define pivot joints at their points of connection. The scissor 76 is connected to the buckle 12 at the distal most joint, and to the structure 16 at the opposite (e.g., lowermost) joint. As such, the buckle 12 is caused to linearly translate relative to the structure 16, when the scissor 76 expands and collapses. The material 64 preferably defines an accordion configuration that facilitates scissor function. The actuator 22 includes at least one, and more preferably, two oppositely configured SMA wires 24 (FIG. 9a). The wires 24 are each connected to the distal and lower most joints, and meander around, so as to be entrained by, the outer joints. When the wires 24 are activated and caused to contract, the lateral spacing between the outer joints is reduced. As a result, the buckle 12 is extended to the deployed position.

When the wires 24 are deactivated, the weight of the buckle 12 causes the scissor 76 to collapse, and the buckle 12 to return to the stowed position. More preferably, an extension return spring 40, also connected to the distal and lower most joints, is provided to further bias the scissor 76 towards the collapsed condition, and the buckle 12 towards the stowed position.

In another collapsible strap configuration (FIGS. 10 and 10a), the presenter 10 includes a compressible spring 80 disposed between the buckle 12 and a fixed portion 82 of the strap 32. The portion 82 may be anchored to, or so as to provide an added degree of freedom, define a pivot 84 with the fixed structure 16. The buckle 12 has affixed to its bottom a cable (or rod) 86. The actuator 22 includes at least one SMA wire 24 longitudinally connected to the cable 86 and at the opposite end to the fixed structure 16. As shown in the illustrated embodiment, the wire 24 may be coaxially aligned with the cable 86; alternatively, however, it is appreciated that where packaging requires, the wire 24 may also be spooled about and attached to a fixed cylinder (not shown).

Figure 10:
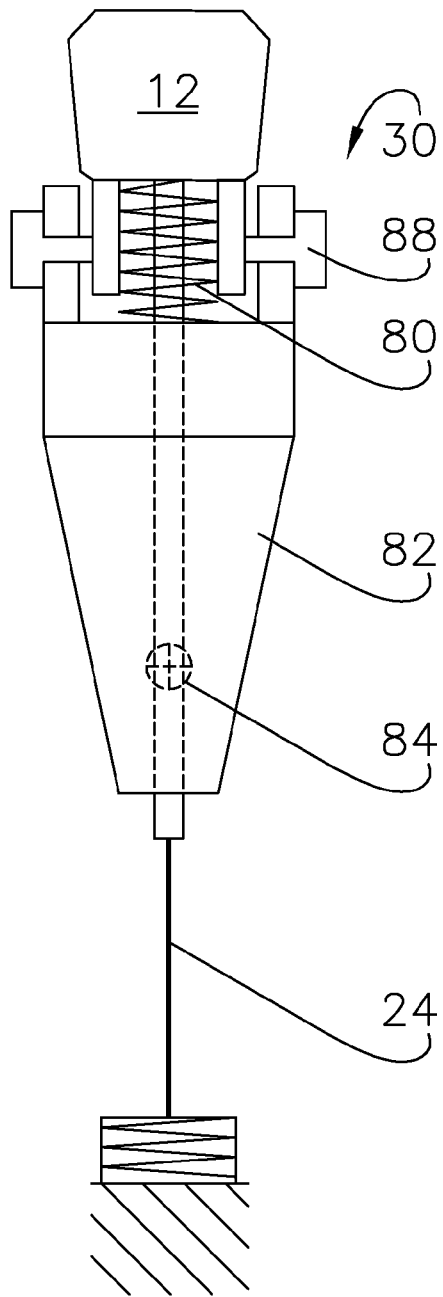
FIG. 10 is a schematic elevation of a buckle, collapsible strap, and an active material based buckle presenter including an SMA wire, cable intermediate and longitudinally connected to the buckle and wire, and a return spring coaxially aligned with the cable, in accordance with a preferred embodiment of the invention.
Figure 10A:
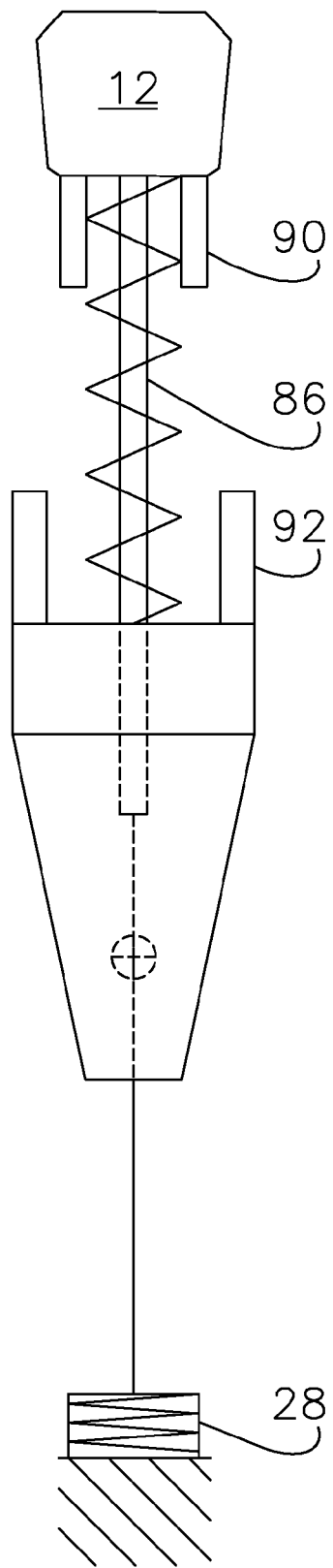
FIG. 10a is a schematic elevation of the buckle, strap and presenter shown in FIG. 10, wherein the wire has been deactivated and the buckle is in the deployed position.

When activated, the SMA wire 24 contracts, causing the cable 86 to recede within a diametrically congruent opening defined by the portion 82. A strain relief mechanism 28 is preferably provided intermediate the wire 24 and structure 16, and accommodates the wire 24, when the buckle 12 and cable 86 are not able to recede. The compression spring 80 stores energy during activation, and works to bias the buckle 12 towards the deployed position. Finally, a latching mechanism 30 is preferably provided to hold the buckle 12 in the stowed position, until deployment is desired. More particularly, and as shown in FIG. 10, the latch 30 may include retractable plugs (tapered pins, ball bearings, or the like) 88 that inter-engage wall sections 90 emanating from the bottom of the buckle 12. The plugs 88 pass through openings defined by an upper wall 92 of the strap portion 82, when the upper wall 92 and the wall sections 90 are longitudinally caused to form concentric sleeves (FIG. 10). The plugs 88 are preferably spring biased towards extended positions. When deployment is desired, and the wire 24 has been deactivated, manual, electro-mechanical, active material based, or otherwise release of the latch 30 is effected.

Finally, in a pivotal and collapsible embodiment, the presenter 10 presents a simplified configuration consisting of at least one SMA wire 24 wrapped around the pivot axis, p, defined by an axle, or stalk (FIG. 11). The strap 32 is resistively collapsible by a compression spring (or air cylinder, etc.) 94. The wire 24 is fixedly connected to the upper end of the strap 32, and at the opposite end to the fixed structure 16. In addition to the compression spring 94, the biasing mechanism 26 may include a torsional return spring 40. As the wire 24 is caused to contract from activation, the buckle 12 and strap 32 are caused to swing, and the compression spring 94 and torsion spring 40 are caused to store energy. When the material is deactivated, the springs 94,40 release their energy antagonistically to the actuation force, so that the buckle 12 returns towards the deployed position. Again, in this configuration, vertical (as shown in hidden-line type in FIG. 11) or horizontal stowage can be achieved depending upon the orientation of the wire 24 and the lateral side of attachment to the strap 32.

It is appreciated by those of ordinary skill in the art that other actuator configurations and/or active materials may be used in the present invention. For example, an active material rotary hinge, as disclosed in co-owned U.S. patent application Ser. No. 11/744,966 (incorporated by reference herein), may be used in conjunction with a pivotal strap 32. Other configurations include active material based torque tubes, shape memory polymer springs presenting differing activated and deactivated spring moduli, and active material actuation combined with gears, pulleys, ramps and other devices designed to provide mechanical advantage to the material.

In a preferred mode of operation, the active material element 24 is coupled to a signal source 96 (FIG. 1), such as the charging system of a vehicle. The signal source 96 is operable to generate and deliver to the material a signal sufficient to activate the material. It is appreciated that the signal may be electrical, thermal, stress related, chemical, magnetic, or the like, depending upon the particular active material employed. In the illustrated embodiment, the element 24 is coupled to the source 96, via hardwire or through wireless communication. Next, a controller 98 is intermediately coupled to the source 96 and element 24, and programmably configured to selectively cause the element 24 to be exposed to the signal. For example, the controller 98 may be configured to activate the element 24 for a predetermined period (e.g., 10 seconds) upon receipt of a sufficient signal, which may result, for example, by starting the vehicle. Where a plurality of wires 24 are utilized, the controller 98 is preferably separately coupled to, so as to be able to individually control, each wire 24. This results in the ability to vary the actuation force and period.

More preferably, at least one sensor 100 operable to detect a condition of interest, is communicatively coupled and configured to send data to the controller 98. As such, the controller 98 and sensor 100 are cooperatively configured to determine when a buckle deployment situation occurs, either when the condition is detected, or a non-compliant condition is determined through further comparison to a predetermined condition threshold; for example, an occurrence may be found, where a force greater than 90 N (i.e., 20 lbs) is initially detected by a piezoelectric-based load sensor 100 (FIG. 1). Where an occurrence is found, the element 24 is exposed to the signal until activated, so as to present the buckle 12 (again, in the alternative, the reverse may be applied for stowing).

The triggering condition may be the act of pulling the safety belt webbing 18, opening or closing a vehicle door 102, occupying the associative passenger seat 16, fastening or unfastening the clasping structure 20 and buckle 12, or turning the ignition switch 104 on or off. Once the element 24 is activated, the controller 98 is configured to discontinue the signal after a predetermined period (e.g., 10 seconds), so as to present sufficient opportunity for the user or occupant to fasten his or her seat belt. Alternatively, it is appreciated that a delayed return, resulting in an equivalent deployment period, may be accomplished by insulating the wires 24, such that cooling is retarded.

Ranges disclosed herein are inclusive and combinable (e.g., ranges of "up to about 25 wt %, or, more specifically, about 5 wt % to about 20 wt %", is inclusive of the endpoints and all intermediate values of the ranges of "about 5 wt % to about 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

Suitable algorithms, processing capability, and sensor inputs are well within the skill of those in the art in view of this disclosure. This invention has been described with reference to exemplary embodiments; it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

What is claimed is:

1. An autonomous safety buckle presenter adapted for use with a structure, said presenter comprising:
    a buckle translatably connected to the structure, so as to be caused to achieve deployed and stowed positions;
    an actuator including at least one active material element operable to undergo a reversible change when exposed to an activation signal, said actuator being drivenly coupled to the buckle, such that the buckle is caused to translate to one of said deployed and stowed positions, as a result of the change; and
    a latching mechanism configured to engage the buckle in said one of the positions, and configured to hold the buckle in said one of the positions when the change is reversed.

2. The presenter as claimed in claim 1, wherein the buckle is pivotally coupled to the structure, the actuator is configured to cause the buckle to pivot from one of the stowed and deployed positions, as a result of the change.

3. The presenter as claimed in claim 1, wherein the actuator further includes a biasing mechanism configured to cause the buckle to translate back to said one of the stowed and deployed positions.

4. The presenter as claimed in claim 1, wherein the actuator includes first and second antagonistic shape memory alloy wires, the first wire is in a deactivated austenitic state and the second is in a normally martensitic state, such that thermal activation of the second wire causes a stress induced activation of the first wire.

5. The presenter as claimed in claim 1, wherein the actuator is coupled to a signal source through a controller, the source is operable to generate the signal, and the controller is configured to selectively cause the element to be exposed to the signal.

6. The presenter as claimed in claim 1, wherein the actuator includes a lever defining pivot axis, intermediately coupled to the element and buckle, and configured so as to be caused to pivot by the change and to cause the buckle to translate when pivoted.

7. The presenter as claimed in claim 1, wherein the actuator includes an elongated cable longitudinally connected to the element and buckle, and a spring coaxially aligned with the cable and configured to be compressed by the buckle in the stowed position.

8. The presenter as claimed in claim 1, wherein the actuator includes an active material rotary hinge.

9. The presenter as claimed in claim 1, wherein the element includes at least one shape memory alloy wire.

10. The presenter as claimed in claim 9, wherein each of said at least one wire is insulated.

11. An autonomous safety buckle presenter adapted for use with a structure, said presenter comprising:
    a buckle translatably connected to the structure, so as to be caused to achieve deployed and stowed positions; and
    an actuator including at least one active material element operable to undergo a reversible change when exposed to an activation signal,
    said actuator being drivenly coupled to the buckle, such that the buckle is caused to translate to one of said deployed and stowed positions, as a result of the change,
    wherein the actuator further includes a strain relief mechanism.

12. The presenter as claimed in claim 11, wherein the mechanism includes a spring intermediately connected to the element and structure.

* * * * *